(12) United States Patent
Heiske et al.

(10) Patent No.: US 6,714,973 B1
(45) Date of Patent: Mar. 30, 2004

(54) METHOD AND CONFIGURATION FOR OPERATING A COMMUNICATION NETWORK

(75) Inventors: Harald Heiske, Augsburg (DE); Wolfgang Backer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/494,411

(22) Filed: Jan. 28, 2000

Related U.S. Application Data

(63) Continuation of application No. PCT/DE98/01955, filed on Jul. 13, 1998.

(30) Foreign Application Priority Data

Jul. 28, 1997 (DE) .......................... 197 32 435

(51) Int. Cl.⁷ ............................. G06F 15/173
(52) U.S. Cl. ..................... 709/223; 709/250
(58) Field of Search .................... 709/223, 224, 709/225, 250; 714/4, 47; 370/241

(56) References Cited

U.S. PATENT DOCUMENTS

| | | | | | |
|---|---|---|---|---|---|
| 5,761,502 A | * | 6/1998 | Jacobs | .................. | 707/103 |
| 6,125,390 A | * | 9/2000 | Touboul | .................. | 709/223 |
| 6,173,322 B1 | * | 1/2001 | Hu | .................. | 709/224 |
| 6,192,034 B1 | * | 2/2001 | Hsieh et al. | .................. | 370/241 |
| 6,192,403 B1 | * | 2/2001 | Jong et al. | .................. | 709/224 |

FOREIGN PATENT DOCUMENTS

| | | |
|---|---|---|
| EP | 0367699 A2 | 5/1990 |
| EP | 0511925 A2 | 11/1992 |
| EP | 0720329 A2 | 7/1996 |

OTHER PUBLICATIONS

Published International Application No. 94/23514 (Brown), dated Oct. 13, 1994.
Published International Application No. 97/24838 (Jacobs), dated Jul. 10, 1997.
Published European Patent Application No. 0 720 329 A2 (Schettler et al.), dated Jul. 3, 1996.
Published European Patent Application No. 0 511 925 A2 (Allen et al.), dated Nov. 4, 1992.
Published European Patent Application No. 0 367 699 A2 (Cole et al.), dated May 9, 1990.
Published International Application No. 94/23514 (Brown), dated Oct. 13, 1994.
Published International Application No. 97/24838 (Jacobs), dated Jul. 10, 1997.

* cited by examiner

*Primary Examiner*—Zarni Maung
(74) *Attorney, Agent, or Firm*—Laurence A. Greenberg; Werner H. Stemer; Gregory L. Mayback

(57) ABSTRACT

A method for operating a communication network, in which the states of the hardware units in the communication network are ascertained and information about assignments of the communication links to the hardware units is used to determine the states of the communication links.

15 Claims, 2 Drawing Sheets

US 6,714,973 B1

METHOD AND CONFIGURATION FOR OPERATING A COMMUNICATION NETWORK

CROSS-REFERENCE TO RELATED APPLICATION

This is a continuation of copending International Application PCT/DE98/01955, filed Jul. 13, 1998, which designated the United States.

BACKGROUND OF THE INVENTION

Field of the Invention

The invention relates to a method for operating a communication network and to a configuration for carrying out the method. In the context of this application, the term "data" also refers to voice data and signaling data. The term "transmission" encompasses the operations involved in transmitting and/or receiving both in the form of point-to-point and in the form of point-to-multipoint communication.

Communication networks permit temporary or permanent transport of information between spatially separate communication partners (subscribers). By way of example, the information can contain speech, text, characters, graphics, still or moving images. The information is passed along a fixed or variable path, the transmission path from a source to one or more sinks. The transmission path can contain a plurality of transmission sections over which the information is transported using various methods and forms of representation (analog, digital, multiplexed etc.).

To allow communication between particular subscriber stations, switching devices are generally required. The switching devices can be used to establish, along the transmission sections, communication links which can then be used to provide particular subscribers with particular telecommunication services (telephone (PSTN, ISDN), telephone conference, fax, videotex, voice mail, text mail, fax mail, data transmission, leased lines, ATM etc.). A particular telecommunication service can also be requested by the part of a telephone number.

In the context of the present application, a communication link is determined by the physical path which it takes within the communication network and/or by the telecommunication service possible via the communication link and/or by the subscribers provided with a telecommunication service via this communication link. Different telecommunication services can also be based on different data rates, different transmission methods or different communication protocols and can thus demand different technical prerequisites.

To provide these telecommunication services using a communication network, a multiplicity of different hardware units located at different points in the communication network are required. These include, by way of example, the hardware units for line terminating units, transmission and reception devices (transmission, reception diodes for optical fiber transmission, radio antennas, control devices etc.), the switching devices, multiplexers, switching matrices and transmission media (copper cables, coaxial cables, optical fibers etc.). A person skilled in the art will also understand the hardware units to be parts of larger hardware units, individual electronic components (processors, memories etc.), assemblies, plug-in units, plug-in cards, parts of data processing systems and entire control and monitoring systems.

A failure of one hardware unit generally results in failure of a plurality of communication links using the hardware unit for data transmission. The complexity of modern communication networks results in that finding the hardware unit that has failed and ascertaining the communication links affected by this can only be done with difficulty, if at all. However, ascertaining the hardware unit that has failed and the communication links affected by the hardware unit's failure is very important for reliable provision of the telecommunication services offered and for correct charging.

SUMMARY OF THE INVENTION

It is accordingly an object of the invention to provide a method and a configuration for operating a communication network which overcome the above-mentioned disadvantages of the prior art methods and devices of this general type, which can both be used to operate a communication network as efficiently as possible.

With the foregoing and other objects in view there is provided, in accordance with the invention, a method for operating a network, which includes:

storing, in memory devices, information about an assignment of communication links to hardware units forming a communication network, the hardware units used for data transmission via the communication links;

ascertaining states and state changes of the hardware units;

transmitting information about the states and the state changes of the hardware units to control devices;

processing the information about the assignment of the communication links to the hardware units in the control devices; and determining states of the communication links on a basis of the states of the hardware units used for the data transmission via the communication links.

Accordingly, the invention is based on the concept that information about the assignment of the communication links to the hardware units used for data transmission via the communication links is processed in order to determine the states of the communication links on the basis of the states of the hardware units, or vice versa.

In one preferred development of the invention, the states of the hardware units are ascertained and transmitted to the control devices, and, on the basis of this, the information about the assignment of the communication links to the hardware units is used to determine the states of the communication links.

Therefore the communication links, the telecommunication services or the subscribers affected by a hardware unit's failure can be ascertained quickly and efficiently. This also allows hardware units that have failed to be replaced quickly. It is also possible to determine which telecommunication services were not available to which subscribers and when. This also permits correct charging. Subscribers can be informed online about the states of particular communication links and can configure particular communication links online as a result of their being granted partial access to the relevant data.

In a further advantageous variant embodiment, information about state changes in the hardware units is transmitted to the control devices. Thus, information is transmitted whenever there is a change of state in the hardware unit. Therefore, overall, less information is transmitted, the complexity of computation in the control devices is reduced and hence the complexity of operating the communication network is reduced.

In a further refinement of the invention, the states of the hardware units and/or the states of the communication links are described by sub-states defined by standards. This also simplifies implementation of the invention in existing communication networks. It is also conceivable for exactly the same terms to be used to describe the states of the hardware units and of the communication links. Therefore, the operator receives a description of the communication link, which he is already accustomed to, from the hardware units.

In order, by way of example, to block the communication link of a defaulting subscriber, one development of the invention allows the information about the assignment of the communication links to the hardware units to be used to ascertain the hardware units relevant to this communication link, and allows control information to be transmitted from the control devices to the hardware units in order to block specifically those hardware units causing the communication link for the defaulting subscriber to be blocked.

The result of introducing the invention into the system concept of intelligent networks, cellular mobile radio networks, satellite networks, circuit-switched or packet-switched communication networks, voice or data communication networks or integrated services communication networks (ISDN) is significantly more efficient operation of the communication networks than has previously been possible. The present states of the hardware units and of the communication links can be ascertained and queried online.

Other features which are considered as characteristic for the invention are set forth in the appended claims.

Although the invention is illustrated and described herein as embodied in a method and a configuration for operating a communication network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
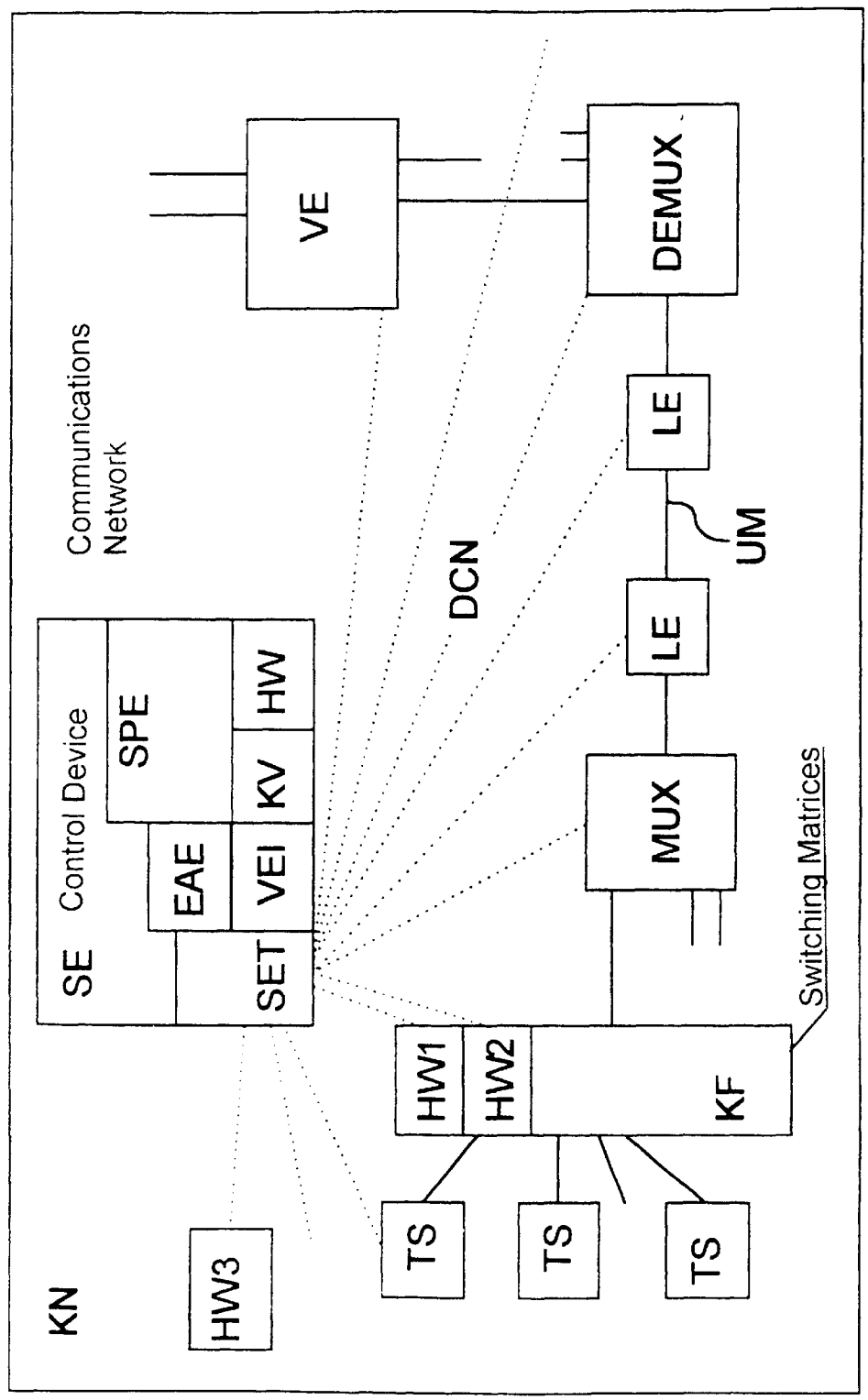
FIG. 1 is a block diagram of a communication network according to the invention.

In all the figures of the drawing, sub-features and integral parts that correspond to one another bear the same reference symbol in each case. Referring now to the figures of the drawing in detail and first, particularly, to FIG. 1 thereof, there is shown a communication network KN containing a plurality of different hardware units such as subscriber stations TS, switching devices VE, multiplexers MUX, demultiplexers DEMUX, line terminating units LE, transmission media UM, switching matrices KF, and other hardware devices HW, HW1, HW2 . . . etc. Between control devices SE and the hardware units, there are links for information transmission, for example in the form of a data communication network DCN.

In the event one of the hardware units in the communication network fails, assignment information stored in memory devices SPE and information, received via a transmission/reception part SET, about the states of the hardware units can be used by a data processing system VEI in the control devices SE to ascertain the affected communication links KV, telecommunication services TKD and subscribers TN, and can be used to display a new state of the communication links KV and of the telecommunication services TKD on an input/output unit EAE.

The state of the individual hardware units in the communication network KN can be described by different sub-states or attributes. The sub-states can assume different values. Advantageously, the state of a hardware unit is also described using sub-states corresponding to defined standards, including:

alarm status in X.731 of ITU-T;

administrative state in X.731 of ITU-T;

operational state in X.731 of ITU-T; and loop status describes whether the forward and return path within the hardware unit is shorted with a particular adjacent assembly for test purposes.

Figure 2:
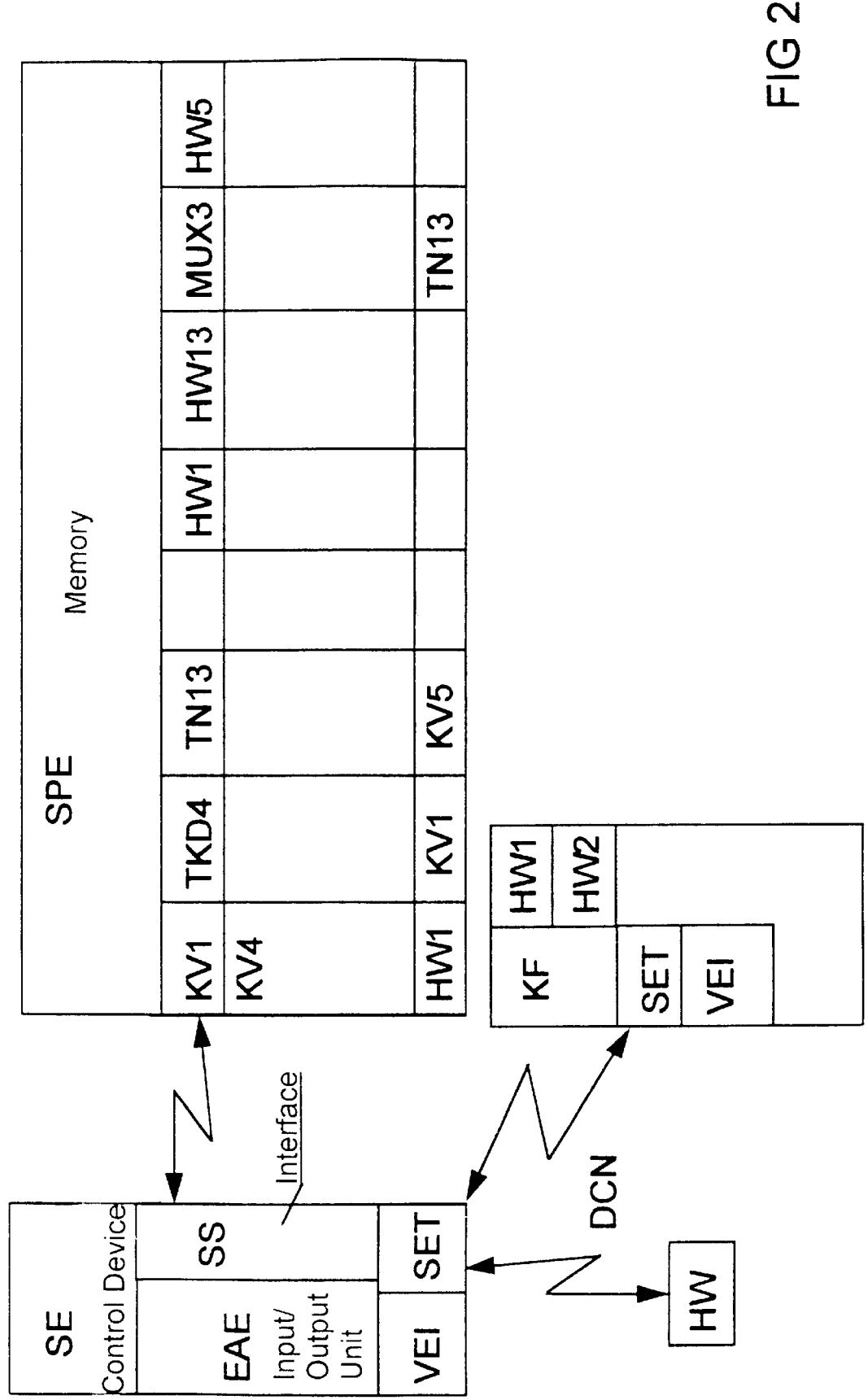
FIG. 2 is a block diagram of one possible implementation of a hardware unit, a central control device, and an assignment of communication links to the hardware units.

If, by way of example, the assembly HW or a processor HW1 in the switching matrix KF fails, then, as shown in FIG. 2, the failure is determined by the processing unit VEI, information about it is processed further and the state of the appropriate hardware unit or of the part of the hardware unit is changed. A transmission/reception part SET of the hardware unit outputs a signal corresponding to the state or the change in state of the hardware unit. In physical terms, at least part of the signal can be transmitted to the central control device SE via the communication network KN already existing beforehand or via transmission paths existing specifically for this purpose. These signals can be transmitted using special signaling channels, signaling protocols or transmission methods based on the data communication network DCN principle. For monitoring large communication networks, a plurality of central control devices SE can be provided, each of which monitors a subregion of the communication network KN.

In the control device SE, the signals are received by the transmission/reception part SET and are processed further by the data processing system VEI using software-controlled processors. Information about the assignment of the communication links KV to the hardware units used for data transmission via the communication links KV is provided in the database SPE or within the storage medium SPE using pointer structures. In this case, the information about the assignment of communication links KV to the hardware units does not have to be stored in the central control device SE itself but can also be transmitted to the control devices SE from the external memory devices SPE. For this, the control device SE can have an interface SS to the internal or external memory devices SPE.

Information about the assignment of the hardware units to the communication links can be stored when the communication network KN is constructed or when the communication network KN is changed, for example by adding new hardware units or setting up new communication links KV, by entering the new hardware unit and the associated communication links using the input/output units EAE. It is also possible for new hardware units or new communication links KV to be ascertained automatically and to be entered in the memory device SPE together with the corresponding communication links KV.

In the event of the hardware unit in the communications network KN failing, the assignment information and the information about the states of the hardware units can be used by the data processing system VEI in the control devices SE to ascertain the affected communication links KV, the telecommunication services TKD and the subscribers TN within a few seconds, and can be used to display the new state of the communication links KV and of the telecommunication services TKD on the input/output unit EAE. In this case, the state of the communication link KV can also be described using the terms from the standards or using appropriate terms.

The present states of the hardware units can be transmitted to the control devices SE at regular or irregular intervals. It is also possible for the control devices SE to be informed only about state changes in the hardware units. By assigning the communication links KV to the hardware units, it is possible, in the event of a change in the state of the hardware unit, to ascertain the states of the affected communication links KV, and hence also the states of the affected telecommunication services, by processing state change signals.

Information about the states of the hardware units and of the communication links KV can be processed further such that any failures in the hardware unit are automatically bypassed as a result of the communication link KV being automatically routed via other hardware units. It is also possible for the input/output unit EAE to be used to inform technicians about hardware units that are in need of repair and where they are located.

Failure periods for particular communication links KV can be ascertained and stored and can be processed further such that correct charging can automatically occur. It is possible to determine which telecommunication services were not available for which subscribers and when. The network operator charges the subscribers or service subscribers only for the telecommunication services which were available.

By way of example, in a hardware unit having a transmission capacity of 34 Mbps, 241 of the existing 480 channels are connected to telephone services. If the hardware unit is now "blocked", the result of this is a change in the administrative status of the hardware unit. A signal corresponding to the new state is transmitted to the central control device SE via the DCN.

Using the assignment of the communication links KV to the hardware units, the states of the affected communication links are determined afresh and are identified as "blocked" on the output unit of the central control device SE. In addition, the network operator can see a list of all the hardware units having the communication link running through them. The blocked hardware unit is marked as "blocked" in the list. This allows any faults occurring to be rectified quickly and makes correct charging possible.

In modern data processing systems, the assignment of the hardware units to the communication links can be easily inferred from an assignment of the communication links to the hardware units. Thus, to block the communication link KV for a defaulting subscriber, the network operator can use the control device SE and the information stored in the database SPE about the assignment of the hardware units to the communication link KV to ascertain the hardware units used for data transmission via the communication link KV.

The control device SE can use an input unit to block the hardware unit used for data transmission via the communication link KV, and hence the communication link KV. For this, the transmission/reception part SET of the control device SE can transmit control signals to the transmission/reception part SET of the hardware unit, for example via the DCN. These signals are then processed in the processing unit VEI in order to block the hardware unit.

In a method described above for managing large communication networks, heavy spates of alarms may, in exceptional cases, occur which can possibly bring the whole management system to a standstill or even cause it to crash.

The alarm messages transmitted by the hardware units and assigned to the communication links can be reduced in the following way. ITU-T Standard X.731 provides the alarm status sub-state for signaling alarms. The sub-state may have none, one or a plurality of the following values:

under repair;
critical;
major;
minor; and
alarm outstanding.

The values of the alarm status sub-state are weighted (critical=4, major=3 etc.). The most serious alarm is assigned the highest value. only the value of the alarm currently having the highest value is used to determine the state of the communication link.

In a further variant embodiment, a state change message (StateChangeNotification) is transmitted from the hardware unit to a control device only if the value of the currently most serious alarm affecting the hardware unit HW changes, e.g. if there is a change from "major" to "critical, major", but not in the event of a change from "major" to "major, minor". If the alarm status of a hardware unit changes from "critical, major, minor" to "critical, minor", then there is also no state change message.

If a plurality of the hardware units used for data transmission in a communication link signal alarms, then only the alarm which currently has the highest value is used to describe the state of the communication link.

If the hardware unit used for the data transmission in 120 different communication links receives a critical alarm (AlarmStatus "critical") owing to failure of a laser, then the 120 communication links are also assigned the AlarmStatus "critical". After 20 minutes, the same hardware unit additionally receives a "minor" alarm (e.g. failure of the battery backup). The alarm is now not assigned to the communication links since the weighting of the most serious alarm has not changed. The hardware unit has the AlarmStatus "critical, minor", and the communication links have the AlarmStatus "critical". In addition, a major alarm arises (e.g. failure of the backup memory). The alarm is again not assigned to the communication links. The hardware unit has the AlarmStatus "critical, major, minor", and the communication links have the AlarmStatus "critical". When the laser is operational again, the hardware unit's "critical" alarm is cleared. The new alarm having the highest value is assigned to the communication links. The hardware unit has the AlarmStatus "major, minor", and the communication links have the AlarmStatus "major". The hardware unit's "minor" alarm is cleared. The hardware unit has the AlarmStatus "major", and the communication links have the AlarmStatus "major".

We claim:

1. A method for operating a communication network, the method comprises:

storing in, at least one memory device, of a control device first information about an assignment of communication links to hardware units forming a communication network, wherein at least one control device controls data transmission over communication links via assigned hardware units, wherein each communication link is determined by a physical path in the transmission network that extends from a source of the data to a sink of the data;

ascertaining states and/or state changes of the hardware units;

transmitting second information about the states and/or state changes of the hardware units to control devices, wherein the data transmission via the communication links is handled by the assigned hardware units; and determining states of the communication links on a basis of the first information and the second information.

2. The method according to claim 1, which comprises describing at least one of the states of the hardware units and the states of the communication links by particular sub-states defined by standards.

3. The method according to claim 1, which comprises blocking a communication link of the communication links by the steps of:
   using the information about the assignment of the hardware units to the communication links to ascertain the hardware units used for the data transmission via the communication link which is to be blocked;
   transmitting information from one of the control devices to at least one of the hardware units used for the data transmission via the communication link which is to be blocked; and
   processing the information in the at least one of the hardware units which causes at least part of the at least one of the hardware units to be blocked.

4. The method according to claim 1, which comprises:
   describing a hardware unit by a sub-state which can assume various values in accordance with a severity of a fault in an operation of the communication network, the sub-state depending on a state of the hardware unit; and
   using information about a value of the sub-state corresponding to a most severe fault in the operation of the communication network for determining a state of a communication link.

5. A method for operating a network, which comprises:
   storing, in memory devices, information about an assignment of communication links to hardware units forming a communication network, the hardware units used for data transmission via the communication links;
   ascertaining states and/or state changes of the hardware units;
   transmitting information about the states and/or the state changes of the hardware units to control devices;
   determining states of the communication links on a basis of the states of the hardware units used for the data transmission via the communication links by processing the information about the assignment of the communication links to the hardware units in the control devices;
   describing a hardware unit by a sub-state for assuming various values in accordance with a severity of a fault in an operation of the communication network, the sub-state depending on a state of the hardware unit;
   using information about a value of the sub-state corresponding to a most severe fault in the operation of the communication network for determining a state of a communication link; and
   transmitting, of the values currently ascertained of the sub-state, only information about the value of the hardware unit corresponding to the most severe fault in the operation of the communication network to the control devices.

6. The method according to claim 1, which comprises triggering a change in the states of the communication links with an input/output unit.

7. The method according to claim 1, which comprises displaying information about the states of at least one of the communication links and the hardware units via an input/output unit.

8. A communication network, comprising:
   hardware units including transmission and switching devices and subscriber stations;
   communication links associated with said hardware units;
   memory devices for storing an assignment of said communication links to said hardware units used for data transmission via said communication links;
   first means for ascertaining states of said hardware units;
   second means for determining states of said communication links on a basis of the states of said hardware units;
   control devices for processing information about the states of said hardware units and the states of said communication links; and
   a device for transmitting information about the states of said hardware units to said control devices.

9. The communication network according to claim 8, including an input/output unit connected to said control devices, said input/output unit triggering changes in the states of said communication links and displaying information about the states of said communication links and the states of said hardware units.

10. A control device for use in a communication network having communication links and hardware units, comprising:
    memory devices for storing first information about assignments of the communication links to the hardware units used for data transmission via the communication links, wherein each communication link is determined by a physical path in the communication network that extends from a source of the data to a sink of the data;
    an interface for accessing said memory devices;
    a reception part for receiving information second about states of the hardware units in the communication network; and
    a processing unit for processing the information received and determining states of the communication links on the basis of the first information and the second information.

11. The control device according to claim 10, wherein said reception part has a transmission part for transmitting further information for changing the states of the hardware units in the communication network, said processing unit generating the further information to be transmitted.

12. The control device according to claim 10, including an input/output unit connected to said processing unit, said input/output unit triggering changes in states of the communication links and displaying information about the states of the communication links and the states of the hardware units.

13. A control device for use in a communication network having communication links, hardware units, and memory devices, comprising:
    an interface for accessing the memory devices, the memory devices storing information about assignments of the communication links to the hardware units used for data transmission via the communication links;
    a reception part for receiving information about states of the hardware units in the communication network; and
    a processing unit for processing the information received.

14. The control device according to claim 13, wherein said reception part has a transmission part for transmitting further information for changing the states of the hardware units in the communication network, said processing unit generating the further information to be transmitted.

15. The control device according to claim 13, including an input/output unit connected to said processing unit, said input/output unit triggering changes in states of the communication links and displaying information about the states of the communication links and the states of the hardware units.

* * * * *